United States Patent [19]

Swank

[11] Patent Number: 5,053,880
[45] Date of Patent: Oct. 1, 1991

[54] IMPLOSION-RESISTANT CATHODE-RAY TUBE WITH MOUNTING LUG HAVING A CURVED SHOULDER PROJECTION

[75] Inventor: Harry R. Swank, Lancaster, Pa.

[73] Assignee: Thomson Consumer Electronics, Inc., Indianapolis, Ind.

[21] Appl. No.: 533,637

[22] Filed: Jun. 5, 1990

[51] Int. Cl.$^5$ ............................................. H04N 5/65
[52] U.S. Cl. ................................................ 358/245
[58] Field of Search ............................ 358/245–248, 358/209

[56] References Cited

U.S. PATENT DOCUMENTS

| | | | |
|---|---|---|---|
| 4,012,773 | 3/1977 | Palac | 358/245 |
| 4,016,364 | 4/1977 | Rogers | 358/245 |
| 4,021,850 | 5/1977 | Rogers | 358/245 |
| 4,264,931 | 4/1981 | Gehl et al. | 358/245 |
| 4,720,657 | 1/1988 | Tischer | 358/246 |
| 4,943,862 | 7/1990 | Uesaka et al. | 358/245 |

*Primary Examiner*—Stephen Brinich
*Attorney, Agent, or Firm*—Joseph S. Tripoli; Dennis H. Irlbeck; Vincent J. Coughlin, Jr.

[57] ABSTRACT

An implosion-resistant cathode-ray tube has an evacuated envelope with a faceplate which includes a substantially rectangularly-shaped viewing portion that extends to a peripheral sidewall. The sidewall has corners with a given radius of curvature which extends into flattened portions. An implosion protection band extends around the sidewall. At least one mounting lug having a base portion and an upstanding attachment portion cooperates with the implosion protection band. The base portion of each of the mounting lugs includes a shoulder projection which substantially conforms to the given radius of curvature of the corners of the sidewall. The attachment portion of the mounting lug is located along a section of the flattened portion of the sidewall of the faceplate panel.

11 Claims, 4 Drawing Sheets

IMPLOSION-RESISTANT CATHODE-RAY TUBE WITH MOUNTING LUG HAVING A CURVED SHOULDER PROJECTION

The invention relates generally to structures for supporting implosion-resistant cathode-ray tubes (CRTs), such as television picture tubes, within a cabinet and, more particularly, to mounting lugs used in conjunction with implosion protection bands.

BACKGROUND OF THE INVENTION

A cathode-ray tube is evacuated to a very low internal pressure and accordingly is subject to the possibility of implosion due to the stresses produced by atmospheric pressure acting on all surfaces of the tube. This problem has been addressed in the art by providing the CRT with an implosion protection band. Such a band is used to apply a compressive force to the sidewall of the CRT to redistribute some of the faceplate forces. The redistribution of the faceplate forces decreases the probability of an implosion of the tube by minimizing tension in the corners of the faceplate. An implosion protection band is also beneficial because it improves the impact resistance of the tube. Glass in compression is stronger than glass which is in tension and the band causes compression in faceplate areas which otherwise would be in tension. Additionally, in the event of an implosion the redistributed stresses cause the imploding glass to be directed toward the back of the cabinet in which the tube is mounted, thereby substantially reducing the probability of someone in the vicinity of the imploding tube being injured..

Mounting lugs, either integral with, attached to, or disposed between the implosion protection band and the tube faceplate are used to support the tube within the cabinet. Typically, the mounting lugs are positioned at the corners of the tube and aligned along the faceplate diagonals, although other placements of the mounting lugs are known in the art. U.S. Pat. No. 4,295,574, issued to Nakazima et al. on Oct. 20, 1981 discloses a shrinkfit band having integral mounting lugs. A drawback of such a unitized structure is that the lugs must be capable of being bent to properly position them relative to the tube. If the bend radius is too small, the lugs might break. Also if all the lugs are not bent correctly, it might be difficult to accurately mount the tube within the cabinet. Since the lugs must be capable of being bent, the mechanical strength of integral lugs also is suspect.

U.S. Pat. No. 4,222,075, issued to Mitchell et al. on Sept. 9, 1980, discloses a metal implosion protection band which encircles and exerts a compressive force on the sidewall of the faceplate panel. At least one "L"-shaped bracket member, or mounting lug, having a base portion connected to an upstanding attachment portion, with the base portion positioned intermediate the metal band and the corner of the faceplate panel, is used to support the tube within the cabinet. The width of the base portion of the mounting lug is made sufficiently narrow so that the implosion protection band contacts the sidewall of the faceplate panel on the radius of curvature of the corner rather than the flattened portions of the sidewall to enhance the implosion-resistant capabilities of the structures. One shortcoming of such a contact is that the base portion of the mounting lug is merely pinched between the band and the corner of the sidewall and care must be taken to properly locate the center line of the base portion of the lug along the diagonal of the faceplate. If the base portion of the mounting lug is improperly aligned, the attachment portion of the mounting lug will be offset relative to the corresponding attachment point in the cabinet. Additionally, if the base portion of the mounting lug is improperly positioned relative to the faceplate diagonal, the compressive forces on that corner of the faceplate will be unequal.

U.S. Pat. No. 4,210,935 issued to Mitchell et al. on July 1, 1980, discloses an "L"-shaped mounting lug used in conjunction with a rimband-type implosion resistant cathode-ray tube. In the patented structure, an adhesive is applied to the sidewall of the tube adjacent to the faceplate. A pair of metal rimbands overlie the adhesive and encircle the sidewall. The "L"-shaped mounting lugs each have a rounded base portion which is affixed to the rimband by a tension band which encircles and compresses the base portion of the mounting lug and contacts the rimband on the radius of curvature of the corner prior to the flattened portion of the sidewall. The latter-described structure has the same shortcomings described with respect to U.S. Pat. No. 4,222,075.

U.S. Pat. No. 4,360,837, issued to Kreidler et al. on Nov. 23, 1982, discloses a rimband implosion protection structure in which discretely formed slots in the rimband components engage compatibly with base portions of the mounting lugs to laterally position the mounting lug prior to tightening the overlying tension band. One drawback of the disclosed structure is that the lug-affixing operation is labor intensive since the contoured base portions of the mounting lugs must be forced through the rimband slots and properly seated before the bands are attached to the tube. Forcing the base portions of the lugs through the slots in the rimbands also present the opportunity to damage or distort the corners of the rimband, thus, adversely affecting the compressive effect of the rimband on the underlying sidewall.

U.S. Pat. No. 3,317,172, issued to Balint on May 2, 1967, shows two different embodiments for mounting picture tubes. In one embodiment, four mounting lugs are located at the corners of a rectangular tube with the lugs aligned along the tube diagonals. The lugs each have a base which is secured to, or by means of, an implosion prevention band, in this instance a tension band, to the tube. In a second embodiment pairs of lugs are located along the oppositely disposed long sides of the tube on the flat portions of the sidewall a short distance from the corners and attached to the band. The advantage of this second embodiment is that the lugs do not extend beyond the short sides of the tube, thereby making it possible to mount the tube in a narrow cabinet. A drawback of such a mounting structure is that the inward force on the portion of the tension band overlying the flat sidewall is proportional to the sine of the angle which the sidewall makes with the horizontal, and for small angles the inward force is very small. For example, if the angle is one degree (sine 0.017) and the force on the band is 3000 lbs., the inward force is only 51 lbs. Since the tension band is relatively thin and flexible, the weight of a large tube may be sufficient to offset the inward force of the band and cause the band to lose contact with the sidewall of the tube thereby jeopardizing the integrity of the implosion band.

SUMMARY OF THE INVENTION

An implosion-resistant cathode-ray tube has an evacuated envelope with a faceplate panel which includes a substantially rectangularly-shaped viewing portion that extends to a peripheral sidewall. The sidewall has corners with a given radius of curvature extending into flattened portions. Implosion protection means extend around the sidewall. At least one mounting lug having a base portion and an attachment portion cooperates with the implosion protection means. The present structure is improved over prior structures by providing the base portion of each mounting lug with a shoulder projection which substantially conforms to the given radius of curvature of the corners of the sidewall. The attachment portion of the mounting lug is located along a section of the flattened portion of the sidewall of the faceplate panel.

DETAILED DESCRIPTION OF THE PREFERRED EMBODIMENT

Figure 1:
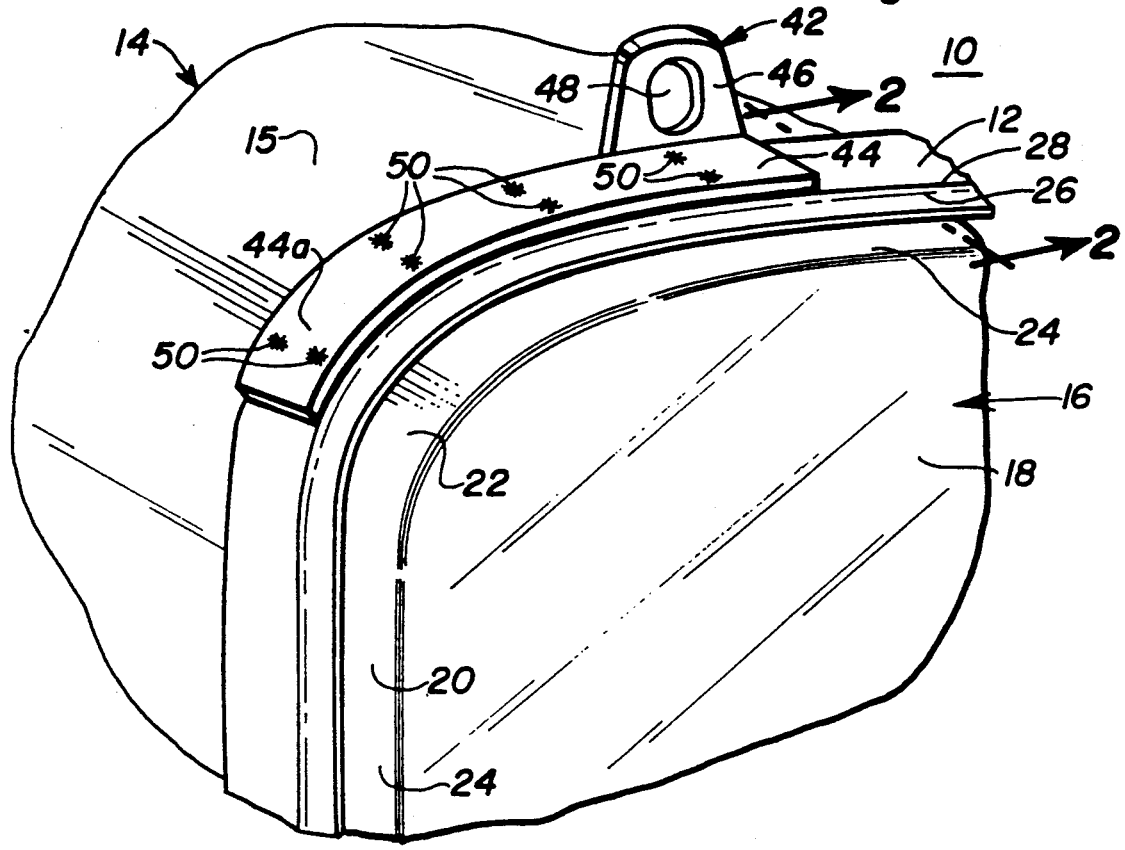
FIG. 1 is a partial perspective view of a forward portion of a CRT showing one embodiment in which a novel mounting lug overlies a shrinkfit implosion protection band.
Figure 2:
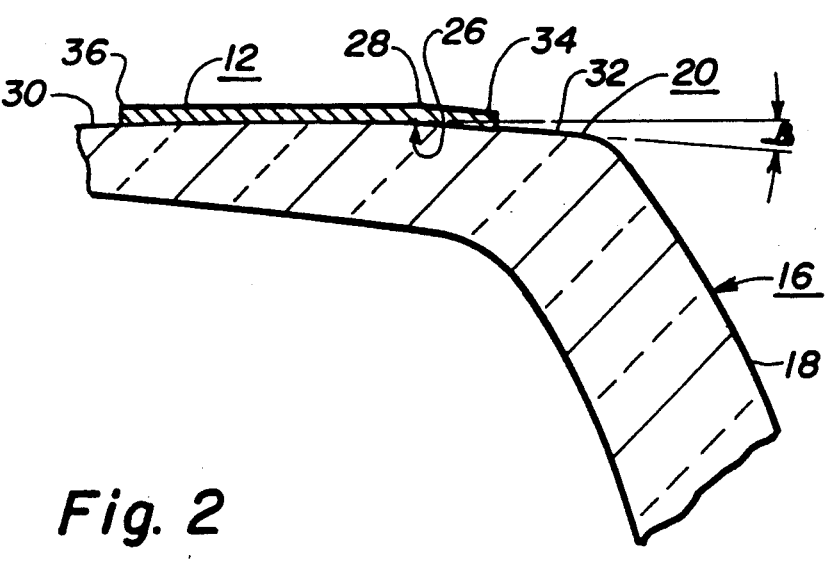
FIG. 2 is a cross section view taken along line 2—2 of FIG. 1.
Figure 3:
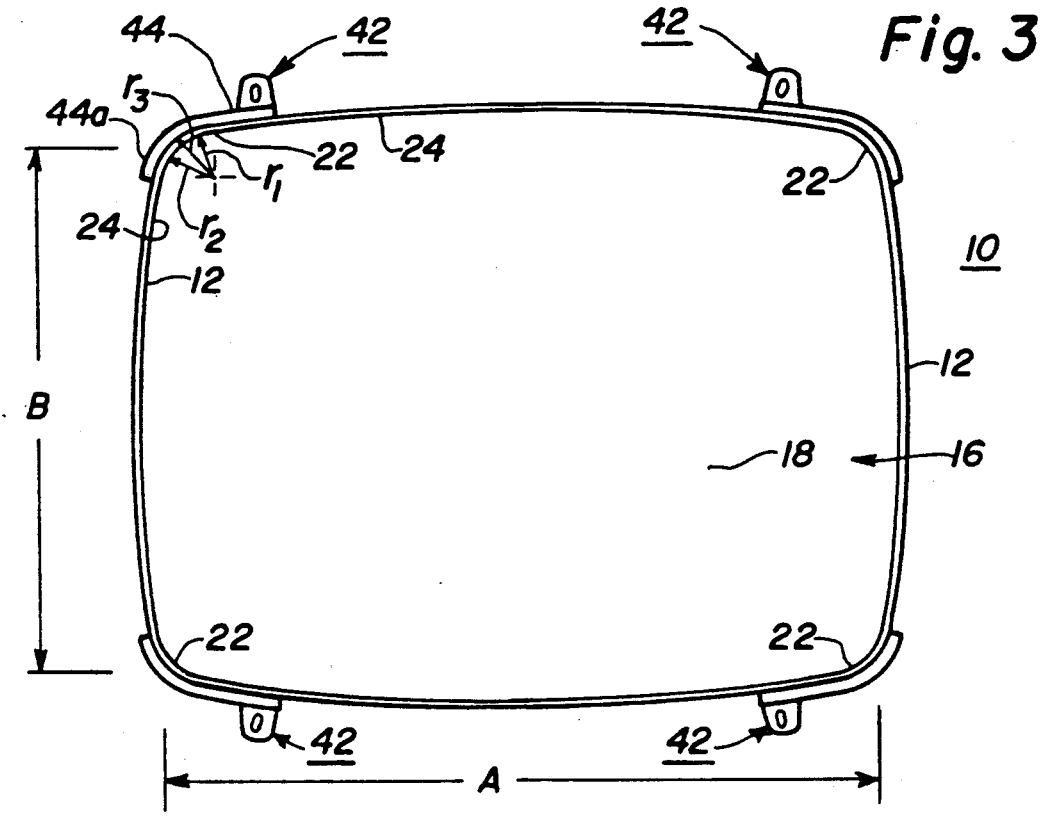
FIG. 3 is a front elevation view illustrating the viewing portion of the CRT faceplate and the implosion band and mounting lugs shown in FIG. 1.

FIGS. 1-3 show an implosion-resistant cathode-ray tube 10 having an implosion protection shrinkfit band 12. The tube 10 comprises an evacuated envelope 14 including a funnel 15 with a faceplate panel 16 sealed thereto. The panel 16 includes a substantially rectangularly-shaped viewing portion 18 extending to an upturned sidewall 20. The sidewall 20 has four corners 22 extending into flattened portions 24. Each of the corners 22 has an outside radius of curvature $r_1$, which is substantially equal to the inside radius of curvature, $r_2$, of a conforming portion of the shrinkfit band 12.

The faceplate panel 16 is produced by molding glass in a two part mold (not shown). Accordingly, the sidewall 20 of the faceplate panel has a convex seam 26, commonly called the mold match line, which is formed where the two parts of the mold meet. Additionally, the sidewall of the faceplate panel is thicker where it joins the viewing portion 18 than it is at the open end which mates with the funnel 15. The angled sidewall improves the molding process and eases extraction of the molded glass panel from the mold. For this reason glass forward of the mold match line 26 is offset and lies at a small angle, $\beta$, with respect to the portion of the sidewall which joins the faceplate. This angle typically is in the order of 5.5°, for example.

The shrinkfit band 12 typically is manufactured by forming a strip of steel into a substantially rectangular loop with rounded corners and joining the two ends of the strip on one side of the band. The long sides of the band are designated A and the short sides B. For present standard tube sizes the long side - short side ratio is 4:3; however, the invention is not limited thereto and may, for example, be utilized on tubes having a long side - short side ratio of 16:9. The periphery of the loop is slightly smaller than the periphery of the faceplate panel 16. The band 12 is heated to approximately 300° to 500° C. and the band expands to dimensions permitting the loop to be slipped around the sidewall 20 and aligned with the mold match line 26 of the faceplate panel 16. As the band cools it shrinks and tightly surrounds the faceplate panel thereby applying the necessary implosion protection compression to the sidewall. The compressive force can be accurately controlled by controlling the yield point and thickness of the band. The corners of the band 12 seat against the corners 22 of the sidewall 20 first during cooling because they are the first contact points. The rest of the band 12 then settles against the flattened portions 24 of the sidewall 20. As the band cools, almost all forces are directed through the band into the blend areas where the straight sidewall blends into the curved corners of the faceplate panel 16. The forces are thus transferred to the panel corners 22 and into the faceplate panel 16 in a ratio proportional to the sine of the angle of the band with respect to the corners of the panel, times the tension of the band. Because the corners of the band 12 are in contact with the corners 22 of the sidewall 20, there is substantially no movement of the band and the long sides of the band can initially adjust themselves and balance forces. A substantial portion of the strain is thus concentrated in the corner blend areas and these forces exceed the yield point of the band metal, thereby placing a controlled compressive force on the corners of the shrinkfit band 12 and through the band onto the corners 22 of the faceplate panel 16. These compressive forces offset tension forces which are produced on the faceplate corners by atmospheric pressure when the tube 10 is evacuated.

FIG. 2 is a cross section of the shrinkfit band 12 and faceplate 16 taken along line 2—2 of FIG. 1. Before it is tensioned, the band 12 has a bend 28 which displaces one edge of the band at an angle of about 6° to 9° away from the plane of the band. The bend 28 extends completely around the band 12. The advantages of the bend 28 can be appreciated from FIG. 2, which is a broken away cross section of the faceplate to be protected. The process of manufacturing the panel 16 utilizes a two piece mold in which glass is molded to form the panel. Because the mold is a two piece mold, the mold match line 26 is formed around the complete periphery of the panel 16 at the point where the two pieces of the mold meet. Also, an outside surface 30 of the open portion where the panel 16 joins the funnel 15 is disposed at the angle $\beta$ with respect to the upper sidewall surface 32 which the viewing portion 18. The angle $\beta$ typically is 5.5° and is utilized because it eases the manufacturing process by making it easier to remove the molded faceplate panel from the mold. Since the bend angle of the band exceeds the angle $\beta$ by about 0.5° to 3.5° before being positioned on the sidewall, when the shrinkfit band 12 cools, both of the edges 34 and 36 contact the surfaces 32 and 30, respectively, of the faceplate panel 16. As the band continues to cool it shrinks to the shape of the sidewall 20 so that almost the entire surface of the band is tightly drawn against the sidewall with the bend area 28 aligned with and overlying the mold match line 26.

The shrinkfit band 12, as described above, is identical to that described in copending U.S. patent application Ser. No. 443,202 filed on Nov. 30, 1989 by H. R. Swank and entitled, "Improved Shrink Fit Implosion Protection Band".

As shown in FIG. 1, a mounting lug 42 having a base portion 44 and an upstanding attachment portion 46, with an aperture 48 therethrough is attached, for example by mechanical means to each corner of the underlying shrinkfit band 12 before the band is attached to the CRT. Welding is preferred if the underlying band 12 has a thickness less than that of the mounting lug 42. Typically the thickness of the shrinkfit band is 1.6 mm and the mounting lugs have a thickness within the range of 2.0 to 3.2 mm and a strength which is sufficient to withstand or avoid distortion if the tube is dropped. The lugs are preferably made from quarter-hard cold rolled steel. A plurality of welds 50 are provided in two spaced-apart rows to secure the lug 42 to the band 12. The two rows prevent twisting of the mounting lug with respect to the band.

The base portion 44 of the novel mounting lug 42 includes an arcuate shoulder projection 44a which extends through an arc of about 75 degrees or greater and substantially conforms to the radius of curvature of the corner 22 of the sidewall 20. The actual radius of curvature, $r_3$, of the shoulder projection 44a depends upon the thickness of the underlying band 12. Since it is desired to locate the attachment portion 46 of each mounting lug 42 along a section of the long flattened portion 24 of the sidewall 20, two of the lugs 42 must have left shoulders and two must have right shoulders. The upright attachment portions 46 are located about 2.5 to 7.6 cm from the corners of the band.

Figure 4:
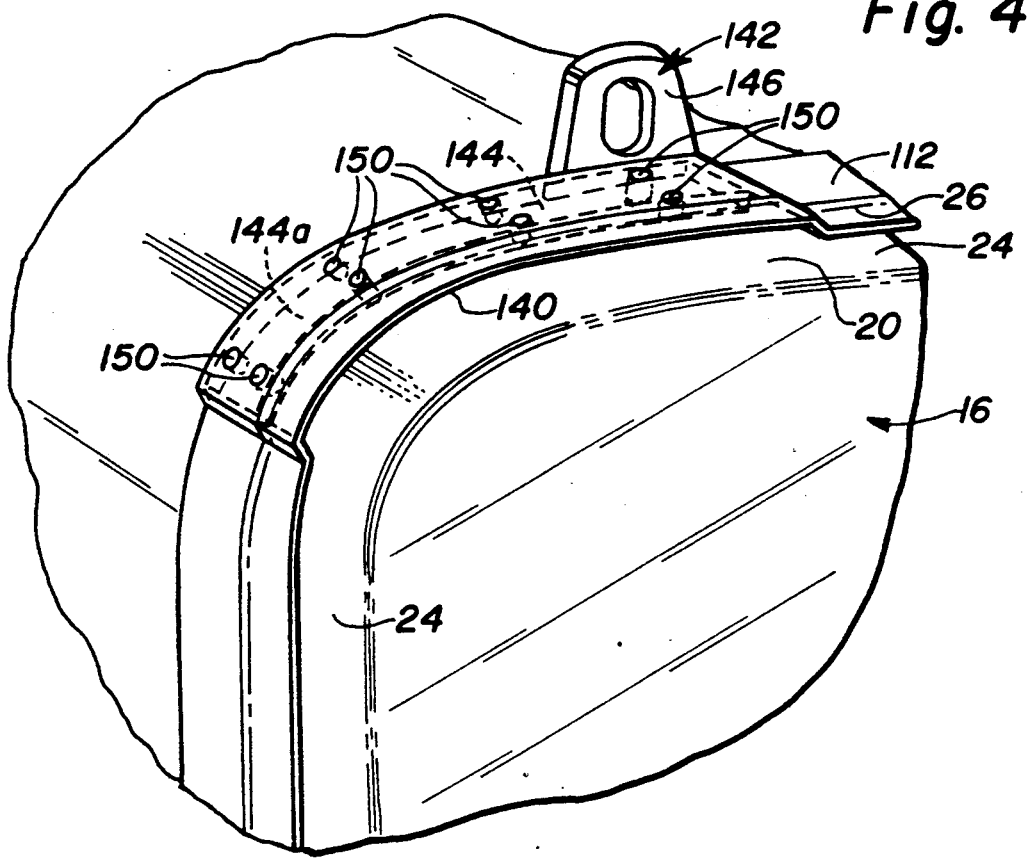
FIG. 4 is a partial perspective view of a forward portion of a CRT showing a second embodiment in which the novel mounting lug is disposed within a concavity in the shrinkfit band.
Figure 5:
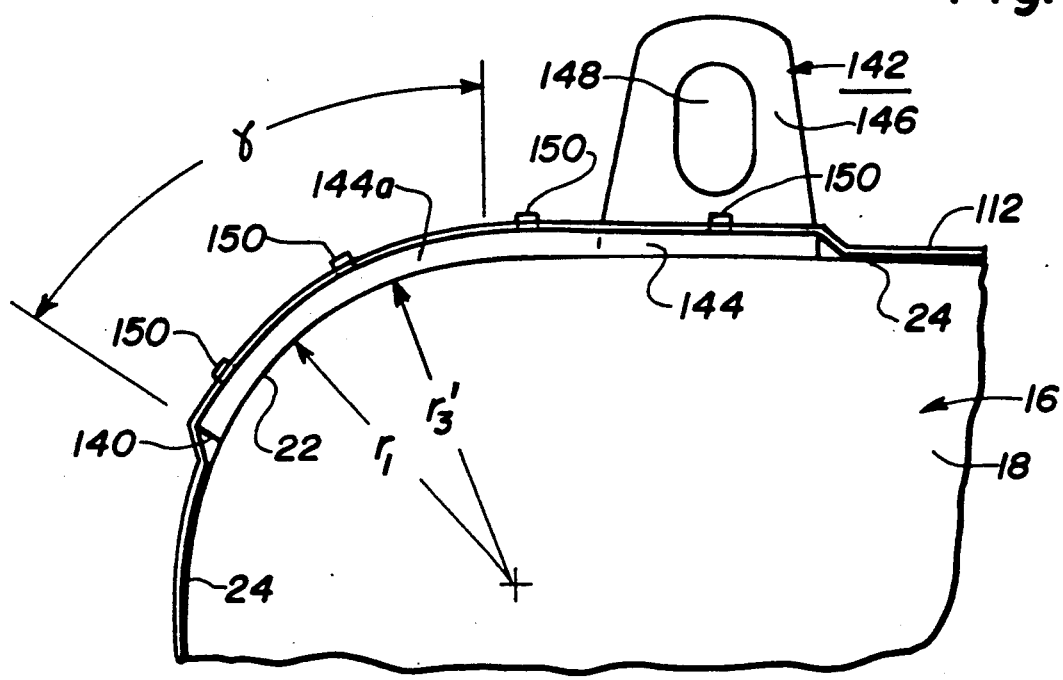
FIG. 5 is a side view of a portion of the CRT faceplate panel and the novel mounting lug shown in FIG. 4.

In a second embodiment, shown in FIGS. 4 and 5, the base portion 144 of the mounting lug 142 including the shoulder projection 144a is disposed between the shrinkfit band 112 and the sidewall 20 of the faceplate panel 16. In order to maximize the contact between the shrinkfit implosion protection band and the sidewall of the faceplate panel a plurality of concavities 140 (only one of which is shown) are formed in the band 112 to accommodate the base portions 144 and shoulder projections 144a of the mounting lugs and to prevent the lateral displacement thereof. Additionally, the concavities 140 are configured to closely conform to the base portions 144 and shoulder projections 144a of the mounting lugs 142 and thereby maximize the contact between the shrinkfit band 112 and the sidewall 20 of the faceplate panel 16. Preferably, the concavities 140 extend across the width of the band. The base portions 144 and shoulder projections 144a are secured to the overlying band 112, preferably by a plurality of mechanical crimps 150 which interlock the overlapping materials as described in U.S. Pat. No. 4,459,735 issued to Sawdon on July 14, 1984, or by riveting or welding. The crimps 150 preferably are arranged in two spaced-apart rows. Since the mounting lugs 142 are disposed under the band 112, the radius of curvature, $r_3'$, shown in FIG. 5, of the arcuate shoulder projections 144a is equal to the radius of curvature, $r_1$, of the corner 22 of the faceplate panel 16. The mounting lugs 142 and the band 112 have the thicknesses described with respect to the first embodiment. The attachment portions 146 are located about 2.5 to 7.6 cm from the corners.

Figure 6:
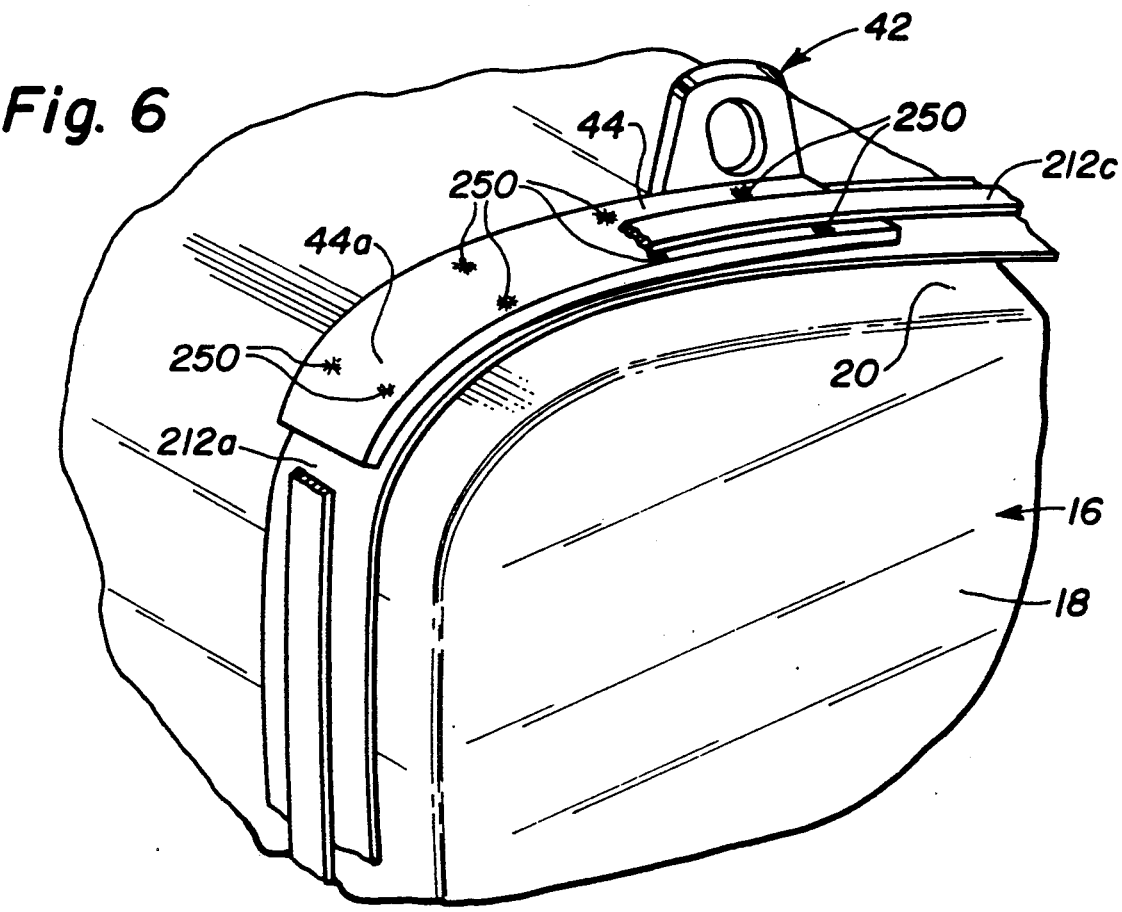
FIG. 6 is a partial perspective view of a forward portion of a CRT showing a third embodiment in which the novel mounting lug is attached to a rimband and covered by a tension band.

A third embodiment is shown in FIG. 6. An adhesive (not shown) is provided around the sidewall 20 of the faceplate panel 16. The adhesive may comprise double-sided tape or any suitable adhesive known in the art. A pair of half-shell rimbands, only one of which, 212a is shown, are oppositely positioned on the sidewall 20 to contiguously surround the viewing portion 18 of the faceplate panel 16. The rimbands are secured to the sidewall by at least one tension band 212c, as is known in the art. The rimbands are described in U.S. Pat. No. 4,210,935, referenced above. A pair of the mounting lugs 42, described with respect to the first embodiment, are attached by two rows of welds 250 to the outside surfaces of the rimbands so that the shoulder projections 44a overlie the corners of the rimbands. The tension band 212c is then attached over the rimbands and the base portions 44 and the shoulder projections 44a of the mounting lugs 42. The tension band 212c is disposed between the row of welds 250 to optimize the contact between the components.

Figure 7:
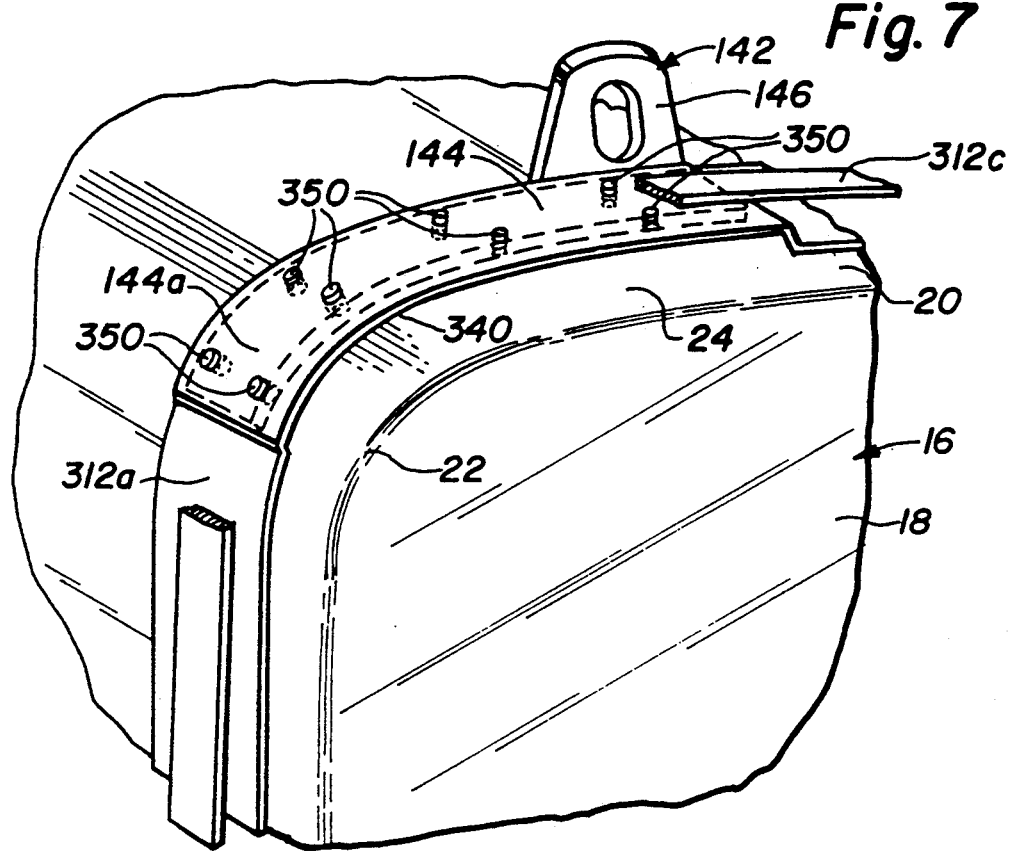
FIG. 7 is a partial perspective view of a forward portion of a CRT showing a fourth embodiment in which the novel mounting lug is disposed within a concavity in the rimband and covered by a tension band.

In a fourth embodiment, shown in FIG. 7, a pair of half-shell rimbands, only one of which, 312a is shown, are oppositely positioned on the sidewall 20 to contiguously surround the viewing portion 18 of the faceplate panel 16. Each of the rimbands has a pair of concavities 340 formed in portions thereof. The concavities 340 overlie at least a portion of the corners 22 and a section of the flattened portions 24 of the sidewall 20 of the faceplate panel 16. The concavities accommodate the base portions 144 and shoulder projections 144a of the mounting lugs 142 and prevent the lateral displacement thereof. The lugs 142 are attached to the overlying rimbands by means of the mechanical crimps 350 which are aligned in two spaced-apart rows so that a tension band 312c can be accommodated therebetween. The tension band 312c secures the rimbands to the CRT.

Figure 8:
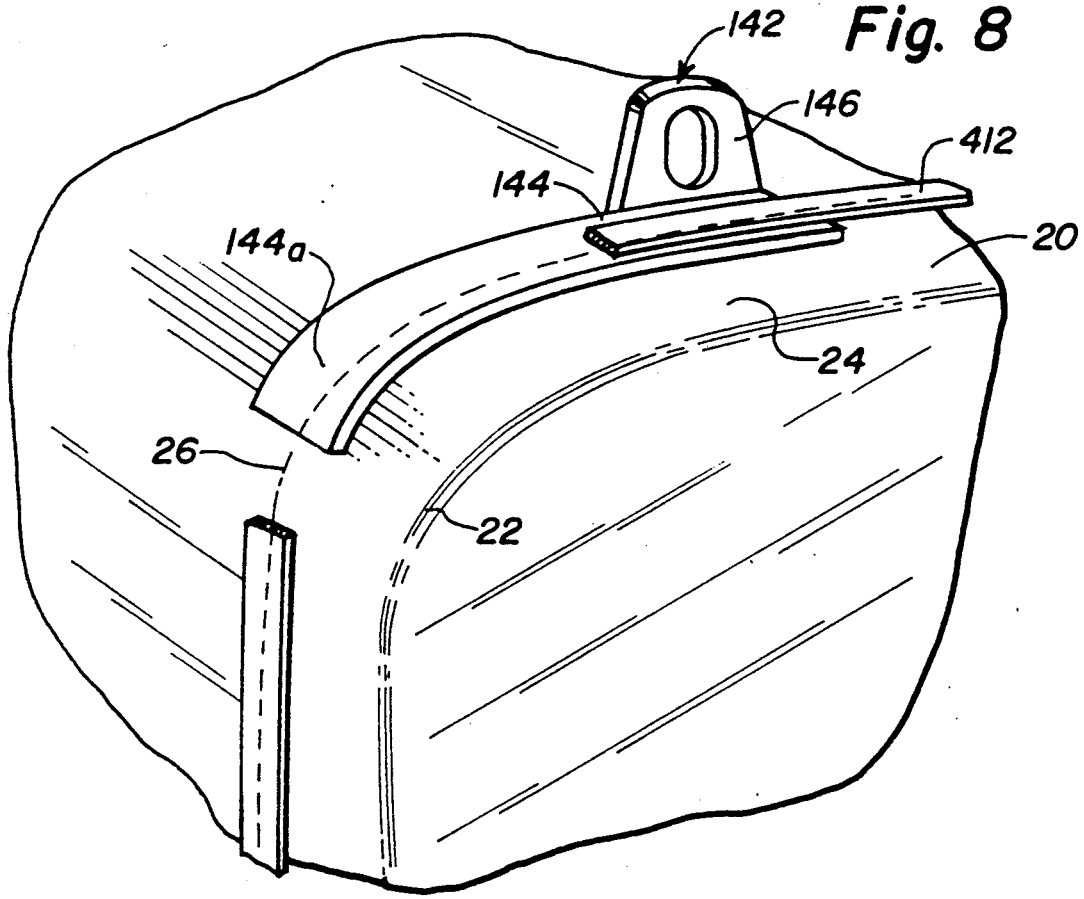
FIG. 8 is a partial perspective view of a forward portion of a CRT showing a fifth embodiment in which the novel mounting lug is disposed directly on the CRT and retained by a tension band.

In yet another embodiment, shown in FIG. 8, the mounting lugs 142 are secured directly to the sidewall 20 by a tension band 412 which overlies the flat base portions 144 and the shoulder projections 144a. Because the shoulder projections 144a substantially conform to the radius of curvature of the corners 22, the lugs 142 are less likely to slip or move than prior lugs which offer only minimal contact surface to the sidewall and the overlying tension band. The flat base portions 144 of the lugs 142 extend along a section of the long sides of the flattened portions 24 of the sidewall 20 thereby permitting the attachment portions 146 to be located about 2.5 to 7.6 cm from the corners of the tube.

What is claimed is:

1. In an implosion-resistant cathode-ray tube having an evacuated envelope with a faceplate panel including a substantially rectangularly-shaped viewing portion extending to a peripheral sidewall, said sidewall having corners with a given radius of curvature extending into flattened portions, implosion protection means extending around said sidewall and at least one mounting lug having a base portion and an attachment portion cooperating with said implosion protection means, the improvement comprising said base portion of said mounting lug having a shoulder projection which substantially conforms to said given radius of curvature of the corners of said sidewall, said attachment portion of said mounting lug being located along a section of the flattened portion of said sidewall o said faceplate panel.

2. The implosion-resistant cathode-ray tube described in claim 1 wherein said implosion protection means comprises a shrinkfit band.

3. The implosion-resistant cathode-ray tube described in claim 2 wherein said base portion including said shoulder projection of said mounting lug is disposed between said shrinkfit band and said sidewall of said faceplate panel.

4. The implosion-resistant cathode-ray tube described in claim 3 wherein a plurality of mounting lugs are disposed between said shrinkfit band and said sidewall of said faceplate panel.

5. The implosion-resistant cathode-ray tube described in claim 4 wherein said shrinkfit band has a plurality of concavities formed therein to accommodate the base portions and the shoulder projections of said mounting lugs to prevent lateral displacement thereof and to maximize the contact between said shrinkfit band and said sidewall of said faceplate panel, said concavities overlying at least a portion of the corners and a section of said flattened portions of said sidewall of said faceplate panel.

6. The implosion-resistant cathode-ray tube described in claim 5 wherein the base portions including the shoulder projections are secured to said shrinkfit band.

7. The implosion-resistant cathode-ray tube described in claim 1 wherein said implosion protection means comprises a pair of rimbands oppositely positioned on said sidewall to contiguously surround said viewing portion of said faceplate panel, said rimbands are secured to said sidewall by at least one tension band which encircles said rimbands.

8. The implosion-resistant cathode-ray tube described in claim 7 wherein said base portion including said shoulder projection of said mounting lug is disposed between said rimband and said sidewall of said faceplate panel.

9. The implosion-resistant cathode-ray tube described in claim 8 wherein a plurality of mounting lugs are disposed between said rimbands and said sidewall of said faceplate panel.

10. The implosion-resistant cathode-ray tube described in claim 9 wherein each of said rimbands has two concavities formed therein to accommodate the base portions and the shoulder projections of said mounting lugs to prevent lateral displacement thereof, said concavities are formed in portions of said rimbands overlying at least a portion of the corners and a section of the flattened portions of said sidewall, the base portions including the shoulder projection of said mounting lugs are secured to said rimbands.

11. The implosion-resistant cathode-ray tube described in claim 1 wherein said implosion protection means comprises at least one tension band, said base portion including said shoulder projection of said mounting lug is disposed between said tension band and said sidewall of said faceplate panel.

* * * * *